INVENTOR.
GEORGE J. LINDER

INVENTOR.
GEORGE J. LINDER
BY
Rackenbach & Siegel
ATTORNEYS

United States Patent Office 3,440,941
Patented Apr. 29, 1969

3,440,941
PHOTOGRAPHIC APPARATUS
George J. Linder, East Islip, N.Y., assignor to Camera Corporation of America, a corporation of Delaware
Continuation-in-part of applications Ser. No. 480,046, Aug. 16, 1965, and Ser. No. 171,988, Feb. 8, 1962.
This application Feb. 6, 1968, Ser. No. 703,291
Int. Cl. G03b 17/50
U.S. Cl. 95—13                                    20 Claims

ABSTRACT OF THE DISCLOSURE

An access door particularly adapted to be mounted upon the housing of photographic apparatus for exposing successive photosensitive portions of a web provided with successive sets of locating apertures, to a subject image. Each exposed portion is developed prior to locating the next portion in a position for exposure, and moved to a position for extraction in a furnished condition.

---

This application is a continuation-in-part of my co-pending application Ser. No. 480,046 filed Aug. 16, 1965 entitled: "Photographic Apparatus," now Patent No. 3,367,252 which is a continuation-in-part of application Ser. No. 171,988 filed Feb. 8, 1962, entitled: "Magazine for a Camera," now Patent No. 3,200,725 and the disclosure thereof is hereby expressly incorporated herein by reference.

The present invention pertains, generally, to photographic apparatus that is constructed and arranged to enable a user of the apparatus to cause the exposure of photosensitive material and its subsequent development all prior to its removal from said apparatus with maximum ease, facility and readiness, and, more particularly, to means for controlling the movement of such materials for exposure and development and for enabling removal of a finished photograph from the apparatus.

A primary object of this invention is to provide for use in photographic apparatus comprising an enclosure or housing and a self-contained disposable unitary cartridge having a supply of photosensitive material and a supply of developing solution or solutions in combination therewith; an access door having a mounting assembly for removably and pivotally mounting said door upon said enclosure or housing, said mounting assembly being constructed and arranged to facilitate assembly and disassembly of said photographic apparatus, and the operation of said door.

A further primary object of the present invention, in addition to the foregoing object, is to provide for use in photographic apparatus comprising an enclosure or housing and a self-contained disposable unitary cartridge having a supply of photosensitive material and a supply of developing solution or solutions disposed therewithin particularly adapted to be removably disposed within the housing; a removable pivotable access door comprising a photosensitive material or film positioning assembly that is constructed and arranged to enable a user to accurately and efficiently, and with maximum ease, facility and readiness, locate successive portions of said photosensitive material or film first at an image plane of said cartridge, at which the successive portions are particularly adapted to be exposed to a subject image, thence within a liquid-tight chamber within which the exposed portion of the photosensitive material or film is particularly adapted to be developed before the next successive portion of the film is disposed at the image plane for exposure to another subject image, and defineably at a location in which the developed portion of the film has been severed from the remainder of the photosensitive material, at which latter location the next successive portion of the material or film for exposure to a subject image has been located at the image plane.

An additional primary object of this invention, in addition to each of the foregoing objects, is to provide for use in photographic apparatus comprising an enclosure or housing and a self-contained disposable unitary cartridge having a supply of photosensitive material and a supply of developing solution or solutions disposed therewithin particularly adapted to be removably disposed within the housing; a removable pivotable access door comprising a photosensitive material or film positioning assembly that is constructed and arranged to enable a user to accurately and efficiently, and with maximum ease, facility and readiness, locate successive portions of said photosensitive material or film first at an image plane of said cartridge, at which the successive portions are particularly adapted to be exposed to a subject image, thence within a liquid-tight chamber within which the exposed portion of the photosensitive material or film is particularly adapted to be developed before the next successive portion of the film is disposed at the image plane for exposure to another subject image, and defineably at a location in which the developed portion of the film has been severed from the remainder of the photosensitive material, at which latter location the next successive portion of the material or film for exposure to a subject plane has been located at the image plane, said film positioning assembly comprising an assembly for severing successive portions of the photosensitive material or film subsequent to the development of each of the exposed portions.

A further primary object of this invention, in addition to each of the foregoing objects, is to provide means for accurately locating and efficiently translating successive portions of a direct-positive type of photosensitive material or film at and between an image plane, at which the portions are particularly adapted to be exposed to a subject image, thence into a liquid-tight container of a unitary self-contained disposable cartridge, within which the exposed portion of the material or film is particularly adapted to be developed before the next successive portion of the material or film is translated to the image plane, and finally to a location at which the developed portion of the material or film can be severed from the remainder thereof, in which latter location the next successive portion of the film to be exposed to a subject image is located at the image plane.

Other objects and important features of the present invention will be apparent from a study of the specification following taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
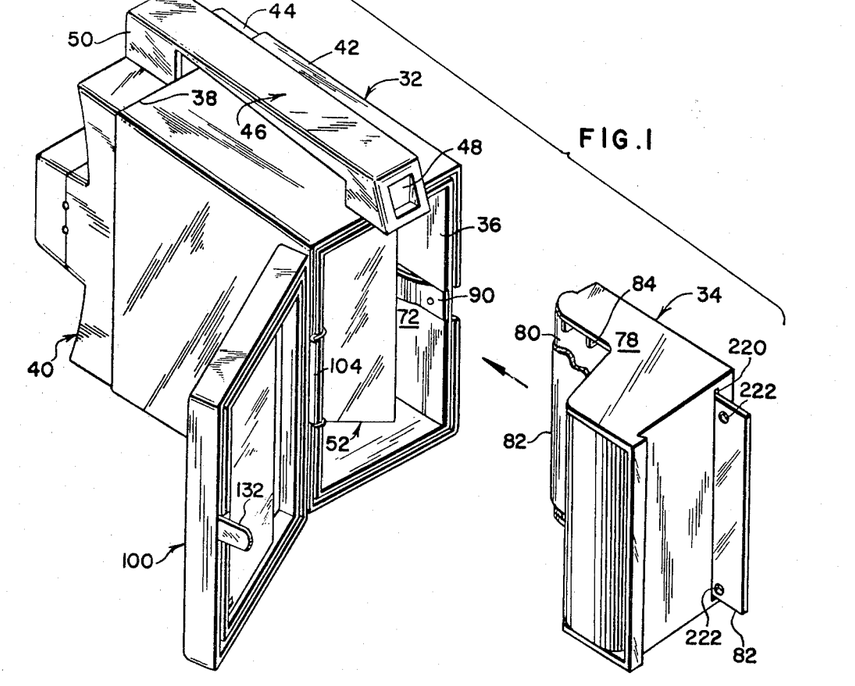
FIG. 1 is an exploded perspective view of photographic apparatus constructed in accordance with the principles of the present invention, illustrating the self-contained unitary disposable cartridge particularly adapted to cooperate therewith for the exposure and subsequent development of photosensitive material or film before the latter is removed from the apparatus.

With reference now to the drawing, and particularly to FIG. 1 thereof, there is illustrated therein photographic apparatus constructed in accordance with the principles of the present invention, and generally designated by the reference character 30. The photographic apparatus or camera 30, which is constructed and arranged to expose successive portions of photosensitive material or film to a subject image, and to successively develop such portions before exposing the next successive portion, all before they are each removed from the camera, comprises an enclosure or housing 32 and a self-contained unitary disposable cartridge 34. The cartridge 34 is shown, illustrated, described and disclosed in the co-pending application identified above. Accordingly, since reference may be had thereto for a detailed description of the cartridge, it is not deemed necessary to present such a detailed description herein. Nevertheless, the cartridge 34 will be shown, illustrated, described and disclosed to the extent necessary to provide a clear understanding of the present invention. In this latter connection, it will be understood that the self-contained unitary disposable cartridge 34 is particularly adapted to be used with conventional types of direct positive film, such as, and by way of example only, films having a diazonium photosensitive layer, or having two image forming materials on a single backing web of material. A negative image will thus be formed in one image forming material by means of a direct photosensitive process, and a positive image formed in the second image forming material by means of a diffusion transfer process, the negative image forming material and the positive image forming material being either combined within in a single layer of emulsion or being in separate superposed layers of emulsion on a single web of backing material. The cartridge will also contain a suitable processing material comprising the required solution or solutions rendering the film capable of producing a positive image completely within the cartridge.

The housing or enclosure 32, which is of generally rectangular construction, comprises one end or a rear end 36 that is open and substantially unobstructed. The housing or enclosure comprises another or front end 38. A lens and shutter system or assembly 40, which may be of any suitable and conventional construction, is fixedly positioned upon the housing 32 at the front end 38 thereof.

The housing 32 and the lens and shutter assembly 40 each comprise a top wall 42 and 44, respectively. A handle 46 is mounted on the camera 30 at the top thereof, and at one end is fixedly positioned upon the top wall 42 of the housing 32, and at another end thereof, is fixedly positioned on the top wall 44. The handle 46 is constructed and arranged to define a view-finding assembly having a rear view finder 48 and a front view finder 50 in alignment with one another.

An image transfer assembly, generally designated by the reference character 52, is fixedly mounted in the housing or enclosure 32. The image transfer assembly is described and disclosed in U.S. Patent No. 3,200,725 the No. 3,367,252, and, accordingly, it is deemed sufficient herein that it enables a portion of a web of photosensitive material 82 to be exposed to an image formed by the lens and shutter system 40. As shown, illustrated, described and disclosed in U.S. Patent No. 3,200,725 the cartridge comprises the side walls 78, and is constructed and arranged to define an image transfer plane 80 comprising, in part, the path of travel of photosensitive material or film 82. The walls 78 each comprise locating or positioning ears 84 extending laterally inwardly therefrom. The ears 84 are particularly adapted to guide the film 82 and traverses the image plane 80.

In order to firmly position the cartridge within the housing 32, a resilient element or spring 90 is mounted upon the side wall 72 of the housing, and is particularly adapted to bear against or engage a surface of the cartridge opposite the image plane 80.

Figure 14:
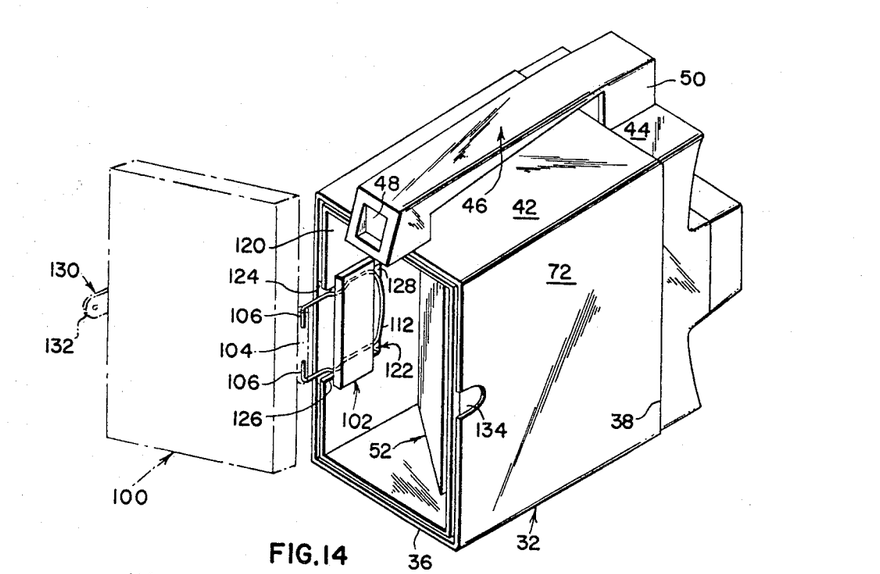
FIG. 14 is a view similar to FIG. 1, illustrating the assembly for pivotably removably mounting the access door upon the housing.
Figure 15:
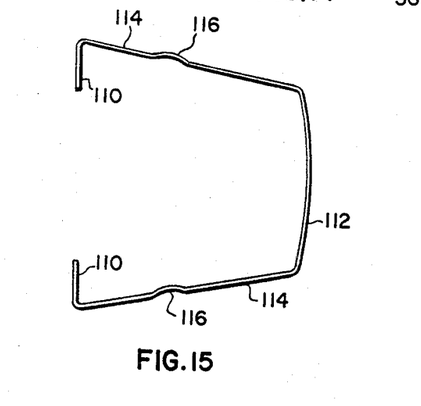
FIG. 15 is a plan view of one of the elements of the mounting assembly shown in FIG. 14.
Figure 16:
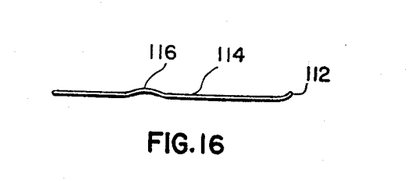
FIG. 16 is an elevational view of the element shown in FIG. 15.

The photographic apparatus or camera 30 comprises further, an access door, generally designated by the reference character 100, which is particularly adapted to be removably and pivotably mounted or positioned upon the enclosure 32. This is accomplished by means of a door mounting assembly 102. The door mounting assembly comprises a boss 104 extending therefrom having a recess 106 at each end thereof. In the alternative, the boss 104 may simply have a passageway or bore (not shown) extending completely therethrough. The mounting assembly 102 further comprises a resilient element or spring 108 having a plurality of fingers 110 that are disposable within a corresponding one of the recesses 106. The spring 108 is of generally trapezoidal configuration in a normal unflexed position, and defines a bight 112 and a plurality of legs 114. As clearly illustrated in FIG. 16, the bight 112 is turned upwardly from the plane in which the legs 114 lie. Each of the legs 114 comprises a raised portion 116 for a purpose hereinafter to be described.

The mounting assembly 110 further comprises a block or panel 118 which is positioned upon the other side wall 120 of the housing or enclosure 32. This side wall 120 has a recess 122 which extends inwardly of the housing or enclosure from the open end 36 thereof. The block or panel 118 extends completely across the recess 122, thus, in effect, substantially enclosing a portion thereof.

It will now be understood that the resilient element or spring 108 is insertable within the recess 122. The legs 114 thereof will engage an upper wall 124 and a lower wall 126 of the recess, thus flexing the legs inwardly towards one another. The raised portions 116, which, like the bight 112, extend from the plane in which the legs 114 lie, will abut against the block or panel 118, thus precluding any movement of the spring 108 between the side wall 120 of the housing 32 and the panel. A space is defined between the panel 118 and an end 128 of the recess 122, into which the bight 112 is insertable. In particular, the bight is particularly adapted to be snap-fitted into this position, to thus preclude inadvertent movement of the resilient element along the recess.

It will now be understood that the mounting assembly 102 enables the access door 100 to be removably snap-fitted into a position with respect to the enclosure 32, in which position the door is pivotably movable between a closed position relative to the housing (see FIG. 5) and an opened position with respect thereto (see FIGS. 1 and 14). Mounting the door is accomplished with facility by simply inserting the spring into the recess 122, until the bight 112 is snap-fitted into a position within the space between the panel 118 and the end wall 128 of the recess. The raised portions 116 and the bight 112 will cooperate with one another in retaining the spring in this position, with the raised portions causing the spring to be frictionally engaged with the wall 120 of the housing and with the panel. The door is removed with equal facility by simply placing a finger against the bight 112 and causing it to enter the space between the wall 120 and the panel 118. This may further be facilitated by pivoting the end of the spring having the fingers 110 towards the wall 72 of the housing 32. The access door 100 is particularly adapted to be maintained in its closed position with respect to the housing in any suitable manner, as through the medium of a conventional closure assembly 130 having male and female closure elements 132 and 134, respectively.

Figures 2, 3, 4, 5, 9:
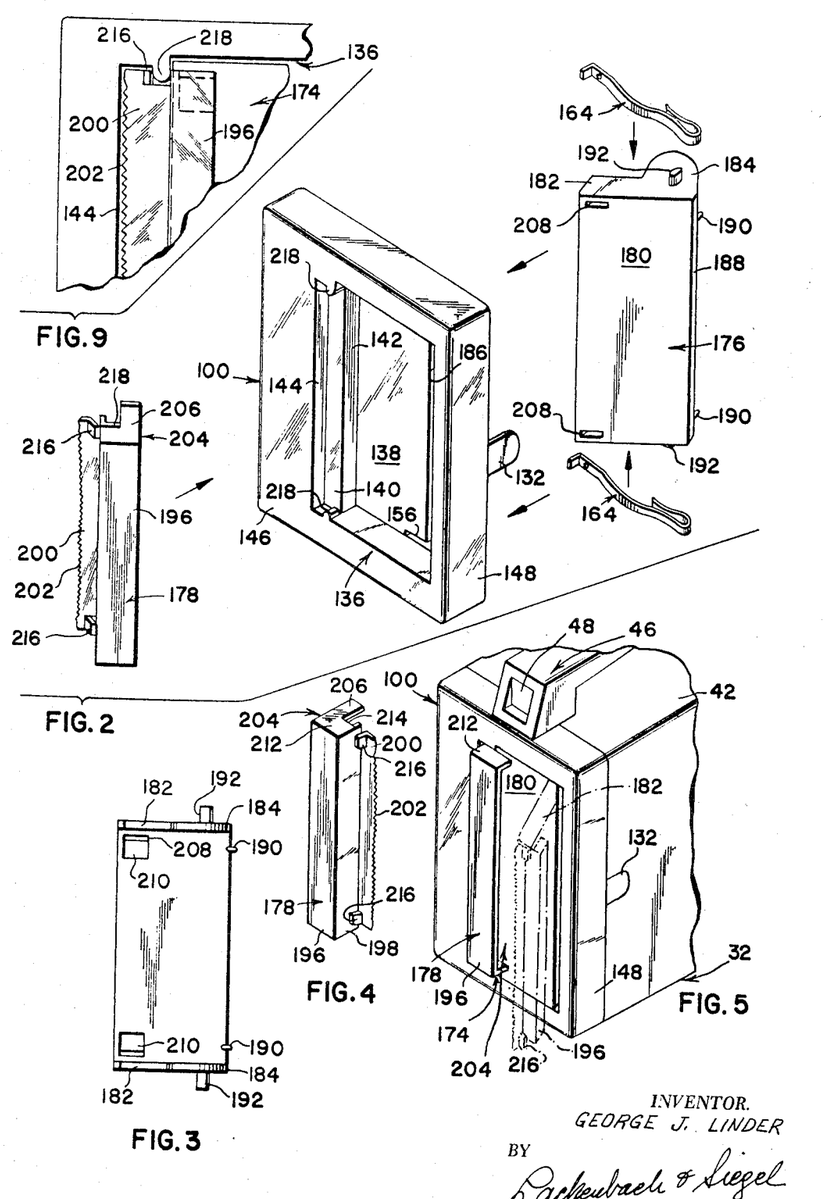
FIG. 2 is an exploded perspective view of the access door for the photographic apparatus, illustrating the photosensitive material or film positioning or locating assembly that is operatively associated therewith.
FIG. 3 is a bottom plan view of one of the elements of the film positioning or locating assembly.
FIG. 4 is a perspective view of another element of the film locating or positioning assembly.
FIG. 5 is a perspective view of the photographic apparatus, broken away, with the access door in a closed position with respect thereto, and illustrating the film locating or positioning assembly in one of its positions with respect thereto in solid lines, and in another of its positions in phantom.
FIG. 9 is a detail view, drawn to an enlarged scale, illustrating the manner in which certain elements of the film positioning or locating assembly cooperate with the access door.

With particular reference now to FIG. 2, the door 100 will be seen to further comprise a recess, generally designated by the reference character 136. The recess 136 is defined by a first bottom wall 138, and a second bottom wall 140. The bottom walls 138 and 140 lie in different planes, and a first ledge 142 extends therebetween. A second ledge 144 extends from the bottom wall 140 to the exterior surface 146 of the access door 100. The first bottom wall 138 extends towards one end 148 of the access door (the end upon which the male closure element of the closure assembly 130 is mounted), and is separated therefrom by a wall 150, which comprises a plurality of vertically extending spaced apart grooves 152. One end of each of the grooves 152 defines a stop surface 154, the purpose of which will be described more fully hereinafter.

Figure 6:
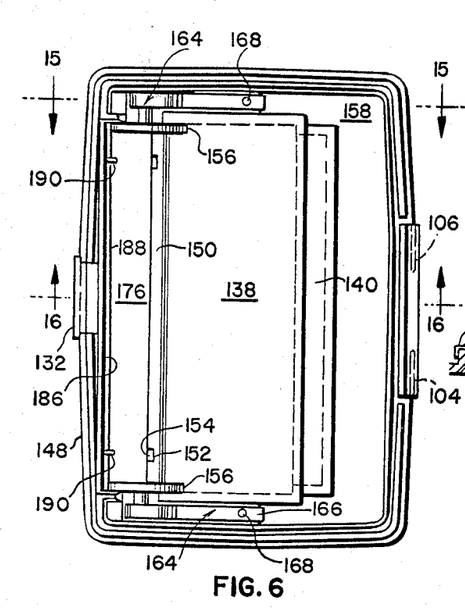
FIG. 6 is a plan view of the interior of the access door

The access door 100, at each end of the wall 150, is provided with a groove 156 which extends into the first bottom wall 138 (see FIGS. 2 and 6). The interior surface 158 of the door is provided with a mounting boss 160 on either side of the first bottom wall 138, which merges into a tapered bearing surface 162. A pair of resilient over-center floating assemblies generally designated by the reference character 164, to be described more fully hereinafter, are mounted within the door, one end 166 of each such assembly being fixedly positioned upon a corresponding one of the mounting bosses 160 in any suitable manner, as through the medium of a fastener 168. It will now be understood that each assembly 164 is connected only at one end thereof to the door 100 and, at the other end thereof, is free to move between and assume a plurality of substantially vertically spaced positions, one of which is illustrated in full in FIG. 7, and the other one of which is illustrated in phantom in that figure.

Figures 7, 10:
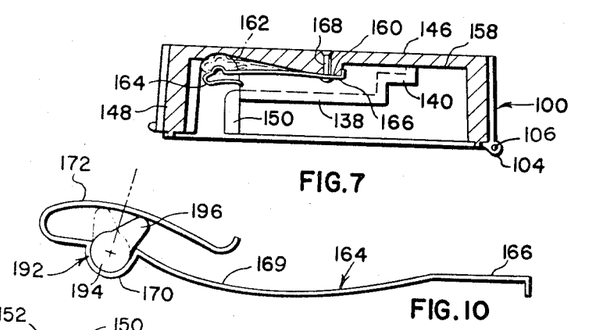
FIG. 7 is a cross-sectional view taken along the line 7—7 of FIG. 6.
FIG. 10 is an elevational view of one of the elements whereby the film positioning or locating assembly is operatively associated with the access door.
Figure 8:
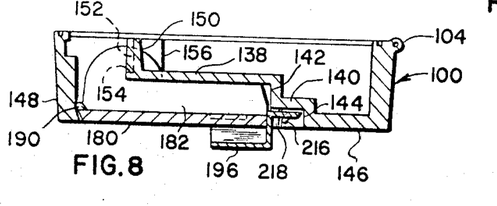
FIG. 8 is a cross-sectional view taken along the line 8—8 of FIG. 6.

With particular reference now to FIG. 10, each resilient over-center floating assembly 164 will be seen to comprise, further, a body portion 169 of curvilinear configuration, a positioning loop 170 of substantially semicircular configuration, and a camming loop 172 that is also of curvilinear configuration. Each of the resilient over-center floating assemblies 164 may be fabricated of any suitable material, and, for example, may be fabricated of a spring steel.

The photographic apparatus or camera 30 comprises, still further, a photosensitive material or film positioning or locating assembly, generally designated by the reference character 174. With particular reference now to FIGS. 2–5 and 9, the assembly 174 will be seen to comprise a film positioning or locating door 176 and a tear assembly 178 for severing successive portions of the photosensitive material or film 82 from one another. The film locating or positioning door 176 comprises a planar body 180 of generally rectangular configuration, and a plurality of arms 182. The arms 182 each comprise an ear 184, each of which, in turn, is particularly adapted to be disposed within a corresponding one of the grooves 156. With particular reference now to FIGS. 2 and 6, it will be understood that the height of each of the arms 182 is substantially the same as the distance from the exterior surface 146 of the door 100 to the first bottom wall 138, so that the exterior surface of the film locating or positioning door 176 will lie substantially flush therewith when the latter is in the position shown in full lines in FIG. 5. Similarly, the transverse dimension of the door 176 is substantially the same as the distance between the ledge 142 and the inside surface 186 of the wall defining the end 148 of the door 100. As is clearly illustrated in FIG. 6, a substantial portion of the door 176 lies within the space defined between the wall 150 and the inside surface 186. It is to be noted, at this point, that when the door 176 is in the position shown in full lines in FIG. 5, the arms 182 are particularly adapted to rest upon the first bottom wall 138. As is now considered readily apparent, the door 176 is particularly adapted to be pivotably moved towards the position shown in phantom in FIG. 5. Accordingly, an edge 188 of the door is particularly adapted to pivot towards the wall 150. The door 176 comprises, further, a plurality of tits 190 mounted on the door along the edge 188 thereof and, therefore, with the edge, are also particularly adapted to be pivotably moved towards the spacing between the tits 190 is the same as the spacing between the grooves 152, enabling the tits to enter a corresponding one of the grooves when the door is pivoted to the position shown in phantom in FIG. 5. It will hereinafter be described in greater detail that each time the film locating or positioning door 176 is moved to the position shown in phantom in FIG. 5, the photosensitive material or film 82 is positioned either to expose a portion thereof to a subject image, or to position a portion thereof that has been exposed to a subject image for development thereof. Accordingly, the position of the door 176 shown in phantom in FIG. 5 can be denoted as a position for locating the photosensitive material or film 82. No movement of the film takes place when the door is in the position shown in full lines in that figure.

The door 176 further comprises a camming lug 192 that extends laterally outwardly from each of the ears 184. The camming lugs 192 are of generally key-hole shaped configuration, having a wide portion 194, and a narrow portion 196, as particularly illustrated in FIGS. 11–13. It will now be understood that the camming lugs 192 are each particularly adapted to be positioned within a corresponding one of the resilient over-center floating assemblies 164. More particularly, the wide portion 194 of the lugs is disposed within the positioning loop 170 of the assemblies 164, while the narrow portion 196 is particularly adapted to ride along the camming portion 172 thereof between the positions illustrated and in phantom lines in FIG. 10. It will be noted that the full and phantom line showings of the camming lug 192 in FIG. 10, as well as the full and phantom-line showings of the assembly 164 in FIG. 7, correspond with the same showings of the door 176 in FIG. 5.

As hereinbefore pointed out, the resilient floating assemblies 164 are each constructed and arranged to define an over-center spring. Thus, the inherent degree of resiliency of each of the assemblies or springs, and the normal position of the camming portion 172 relative to the body portion 168, is chosen to enable the camming portion to exert a force against the narrow portion 196 of a magnitude sufficient to move the camming lugs to either of its positions once it has passed its center of movement. This center of movement may be defined by a line passed through the center of the lugs and perpendicular to a tangent of the camming portion 172. Accordingly, in moving the door 176 to its film locating position, it is only necessary to move the door to an extent sufficient to in turn move the camming lugs just past their center position. The floating springs 164 will then take over and move the door 176 the rest of the way. Once the door is in its film locating position, it will then be maintained therein by the floating assemblies or springs 164. The reverse is similarly true.

As hereinbefore pointed out, the film locating or positioning assembly 174 comprises a tearing assembly 178 for severing successive portions of the photosensitive material or film 82. With particular reference now to FIGS. 2, 4, 5 and 9, the tearing assembly or tear strip 178 will be seen to comprise a top wall 197, a front wall 198 and tear strip 200 having a serrated edge 202. The tearing assembly 178 further comprises a plurality of side walls 204 which are each of generally L-shaped configuration. One leg 206 of each side wall is particularly adapted to function as a tab. More particularly, the legs or tabs 206 are insertable through slots 208 of the body portion 180 of the door 176. The legs or tabs 206 are then folded towards one another, and are particularly adapted to be disposed within recesses 210 provided in the under surface of the body portion 180. The tabs 206 are not fixed within the recesses 210, there resulting some play between the tearing assembly 178 and the door 176, the purpose of which will be described more fully hereinafter.

Figure 13:
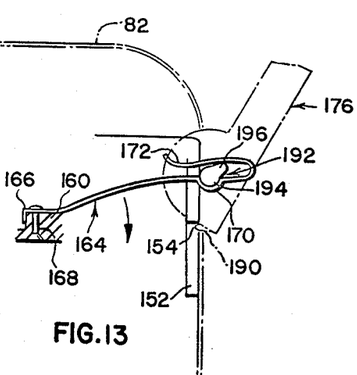

The other leg 212 of each of the side walls 204 defines an edge 214 which, when the tabs 206 have been inserted through the slots 208 and turned or folded into the recesses 210, are particularly adapted to rest upon the surface of the body portion 180 of the door 176, as particularly illustrated in FIG. 13. The dimension of the front wall 198 is then chosen to dispose the tear strip 200 substantially adjacent the second bottom wall 140.

With particular reference now to FIGS. 2, 4 and 9, the tear strip 200 will be seen to comprise a plurality or pair of reverse projections 216 at each end thereof. The terminology "reverse" is intended to mean that the projections 216 extend upwardly from the plane of the tear strip 200, at an obtuse angle with respect thereto, towards the front wall 198. These projections are particularly adapted to engage or cooperate with a corresponding one of a pair or plurality of beads 218 which extend inwardly towards one another from the walls of the recess 136 in the door 100 (see FIG. 2). As clearly shown in FIG. 9, when the door 176 and the tearing assembly 178 is in the position in which a portion of the photosensitive material or film 82 is being subjected to an image, or an exposed portion is being developed (shown in full lines in FIG. 5), the tear strip 200 will be disposed or located substantially adjacent the second bottom wall 140, as pointed out above. Accordingly, the projections 216 will be disposed or located in a position in which they are engageable with the beads 218. It was hereinbefore pointed out that the connection between the door 176 and the tearing assembly 178 provides for some play therebetween. When it is desired to move the door 176 and the tearing assembly 178 to the film locating position, it is necessary to grasp the tearing assembly in such a manner as to exert a force upon the tear strip 200 that will tend to move, or, in effect, pivot the projections 216 away from the beads 218. Any other force will simply enable the projections to engage the beads 218, thus precluding the door 176 and the tearing assembly 178 from inadvertently being moved to that position. The tearing assembly thus performs the additional function of locking the door 176 and the tearing assembly 178 in the position in which the film either is being exposed to a subject image, or an exposed portion thereof is being developed.

With particular reference now to FIG. 1, it will be understood that when the cartridge 34 is disposed within the housing 32, the photosensitive material or film 82 will exit from the cartridge through an exit slot 220 which is in alignment with the space defined between the wall 150 and the inner surface 186 when the door 176 is in a position in which the film is either being exposed to a subject image, or an exposed portion thereof is being developed (shown in full lines in FIG. 5). It is for this reason, that, as hereinbefore pointed out, photographic apparatus or the camera 30 constructed in accordance with the principles of the present invention is virtually self-threading. It will further be understood that, once the film 82 has entered this space, it is turned so that it will traverse the bottom walls 138 and 140, and thence will exit the camera between the second ledge 144 and the tear strip 200.

Figure 11:
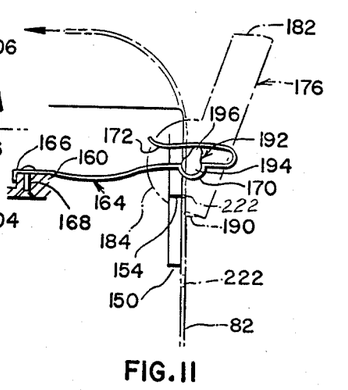
FIGS. 11 through 13 are schematic views illustrating the manner in which the film positioning or locating assembly cooperates with the film or photosensitive material.
Figure 12:
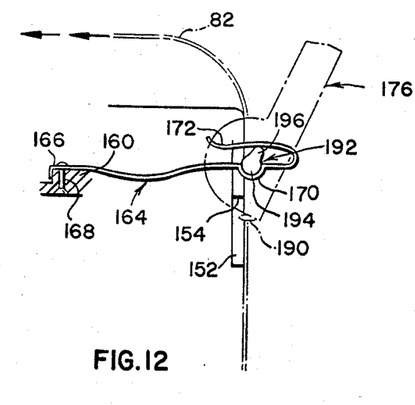

It has hereinbefore been pointed out that the door 176 and the tearing assembly 178 comprise a film locating or positioning assembly. With particular reference now to FIGS. 11–13, and assuming that the cartridge 34 has been inserted within the housing 32, and the access door 100 moved to a closed position, as clearly illustrated in FIG. 5, it is necessary to move the film locating assembly to a film locating position in order to bring the first portion of the film to a position upon the image plane 80. The door 176 is thus pivoted or moved to the position shown in FIG. 11 by grasping the tearing assembly 178 in the manner hereinbefore set forth. As the door is pivoted to this position, the cam 192 will pass its center position, enabling the camming portion 172 to bear against the narrow portion 196 and maintain the door 176 in this position. In so moving the door, the tits 190 will have been pivoted to a position in which they rest upon a film leader that is presented when the door 176 is, in effect, first opened. The film leader can now be grasped, and the film 82 pulled or moved to a position in which a first pair or plurality of apertures 222 are in alignment with the tits 190. Due to the tension of the camming portion 172, a further movement of the door 176 to a film locating position (clockwise as viewed in FIG. 11) will take place, thus causing the tits 190 to pass through the apertures 222 and into the grooves 152 in the wall 150, as clearly illustrated in FIG. 12. The user continues to pull the film leader, during which movement the door 176 will move in a vertical direction as shown in that figure, and the tits 190 will ride within the grooves 152 until they engage or bottom-out upon the surface 154. This movement of the door can take place since the over-center assemblies 164 are inherently resilient, and are fixedly mounted within the access door 100 only at the mounting bosses or surfaces 160. The fasteners 168 thus, in effect, become a fulcrum point about which the assemblies 164 pivot when the door 176 is pulled in the aforesaid direction by the film 82. The resilient over-center assemblies 164 are thus floating assemblies, as hereinbefore pointed out, and are movable between a normal position illustrated in FIGS. 11 and 12, and shown in phantom in FIG. 7, and a flexed position, clearly illustrated in FIG. 13. It is in this latter position that the door 176 has been pulled along with the film 82 until the tits 190 have bottomed-out upon the surface 154 of the grooves 152. It will now be understood that the resilient floating assemblies 164 tend to bias the door 176 to its normal position, and must therefore be flexed in order to allow the door 176 to be moved to the position shown in FIG. 13. This latter position is not only defined by the engagement between the tits 190 and the surface 154 of the grooves 152, but also by engagement of the body portion 168 of each of the floating assemblies 164 with the bearing surface 162 (see FIG. 7) of the access door 100.

A first successive portion of the photosensitive material or film 82 is now positioned at the image plane 80 of the cartridge 34, and is particularly adapted to be exposed to a subject image in a manner that is considered readily apparent to those skilled in the art. The film locating and positioning assembly 176 is now pivoted or moved to the position shown in full lines in FIG. 5. In this position, and as hereinbefore pointed out, the tearing assembly 178 will lock the door 176 against being inadvertently opened because of the engagement between the reverse projections 216 and the beads 218. After this first successive portion of the film has been exposed, it is necessary to move it into the liquid-tight chamber of the cartridge 34 that contains the requisite developing solution or solutions.

The tearing assembly 178 is now grasped in the manner aforesaid (to preclude engagement between the projections 216 and the beads 218 at this time), and the door 176 once again moved to the position shown in FIG. 11. At this point, it is to be noted that when the door 176 was closed, the floating assemblies 164 moved the door towards the bottom wall 138 (vertically downwardly in the schematic illustrations of FIGS. 11–13) due to the biasing force exerted thereagainst. As a result, when the door 176 is once again moved to a film locating position, the tits 190 will have been pivoted to a location in which they once again rest upon the film 82 just behind the first set of locating apertures 222. It can readily be seen that in the absence of this floating movement of the door 176 the tits 190 would tend to reenter the same set of locating apertures 222 from which they are disengaged each time the door is moved to its closed position. This floating movement of the door occurs in two phases; in the first phase, after the tits 190 are engaged within a set or pair of locating apertures 222, the door is moved or floated away from the bottom wall 138; in the second phase, when the door is pivoted to a closed position and the tits 190 are disengaged from the locating apertures 222, the door floats or moves towards the bottom wall 138, and thus returns to its normal position. It is emphasized that when the door is again moved or pivoted to a film locating position, the tits 190 are pivoted to a position in which they again bear upon the film 82 at a location just behind the set of locating apertures 222 from which they were previously disengaged. Such a set of apertures 222 is illustrated in FIG. 11 in phantom. It is also to be noted that each set of locating apertures 222 will be positioned at the surface 154 of the grooves 152 when the door 176 is to be moved to a closed position, and the tits 190 disengage therefrom. The door is maintained in each of its positions by the camming portion 172 of the floating assemblies 164, and is actually urged to each of these positions by the camming portion once the cams 192 have passed their center position, as hereinbefore pointed out.

A first portion of the film 82 has now been exposed, it is ready to be moved into the liquid-tight developing chamber of the cartridge 34, and the door 176 has been pivoted or moved to a film locating position (see FIG. 11), in which position the tits 190 have been pivoted to a location in which it bears upon the film just behind the first set of locating apertures 222 which was responsible for such first portion of the film at the image plane 80. The user again pulls on the film until the next set of locating apertures 222 is in alignment with the tits 190, whence the latter enters the apertures and the grooves 152. The user continues to pull the film, thus pulling the door therewith, and causing it to float away from the bottom wall 138. During this floating movement of the door, the tits 190 ride within the grooves 152 until they once again bottom-out upon the surface 154 thereof. At this time, the exposed portion of the film will be located within the liquid-tight developing chamber of the cartridge 34. It is necessary to now close the door 176. As the door is pivoted to its closed position, it will float towards the bottom wall 138 and return to its normal position with respect thereto under the biasing action of the floating assemblies 164. The user now waits the required time for the exposed portion of the film to be developed. It is to be understood that during this time an exposable portion of the film 82 is not located upon the image plane 80 of the cartridge 34. The required time for the developing having expired, the door 176 is again moved to a film locating position, and the tits 190 pivoted to a location just behind the set of locating apertures 222 from which they have previously been disengaged. The film is pulled by the user, and the developed portion of the film severed by means of the tear strip 200 in a manner that is considered readily apparent to those skilled in the art. In removing the developed portion of the film and severing it, the next successive portion of the film capable of being exposed to a subject image is moved into position upon the image plane 80 and is properly located by means of the next set of locating apertures 222. The door 176 is again closed, and the procedure repeated until all of the available exposable portions of the film 82 have been exposed to a subject image and developed. At such time, the access door 100 is opened, in a manner considered readily apparent to those skilled in the art, and the used cartridge 34 removed from the enclosure 32. The used cartridge can now be disposed, and a new cartridge positioned in its place.

The photosensitive material or film 82 will thus be seen to comprise a plurality of sets of locating apertures 222. It can be said that two different types of locating apertures are provided. One such type is to locate an exposable portion of the film upon the image plane 80. The other type can be said to locate the exposed portion of the film in the liquid-tight developing chamber of the cartridge 34. It is to be remembered that when an exposed portion of the film is located in the developing chamber, the next successive exposable portion thereof has not yet been located upon the image plane. Accordingly, the next set of locating apertures 222 will be of the first type, and the following set of the second type.

It is again emphasized that the floating assemblies 164 are not only responsible for maintaining the door 176 in each of its positions, but actually urge it to these positions once the cams 192 have passed their center position. In connection with the door 176, and as hereinbefore pointed out, it is movable to a position in which it locates or positions the film 82 for each of the hereinbefore described purposes. This position can, for purposes of simplicity, be described as an "open" position with respect to the access door 100. The door 176 is also movable to another position in which a successive portion of the film is either being exposed to a subject image, or an exposed portion thereof is being developpd. This latter position of the door 176 can, for purposes of simplicity, be described as a "closed" position with respect to the access door 100. In addition, and as hereinbefore pointed out, the resilient over-center floating assemblies 164 enable the door to "float" towards the bottom wall 138, or a normal or operative position. In this position, the door is capable of performing its function of properly locating the film 82. The floating assemblies 164 also enable the door to float away from the bottom wall 138. towards an inoperative position. During this latter movement, the door will be performing its function. Once it has reached its inoperative position, the film will have been properly located, and the door can be moved no further until it is returned to its normal or operative position.

Figure 17:
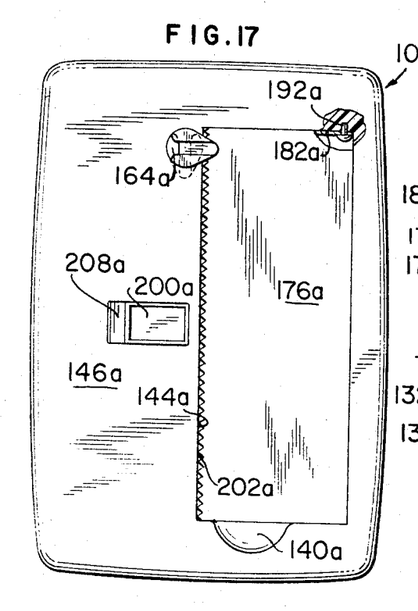
FIG. 17 is an elevational view of the outside of another access door constructed in accordance with the present invention.
Figure 18:
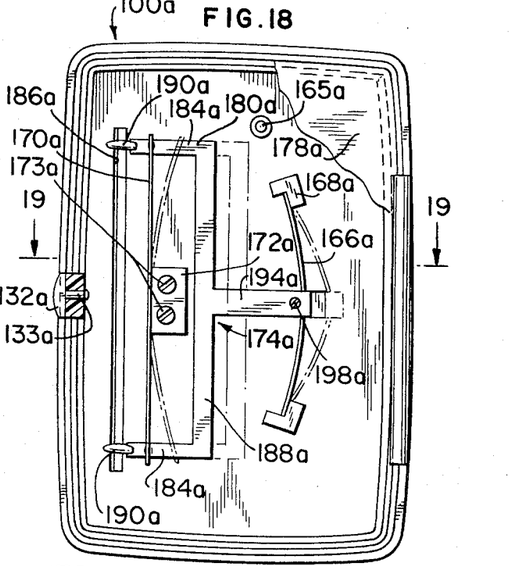
FIG. 18 is an elevational view of the inside of the access door of the preceding figure.
Figure 19:
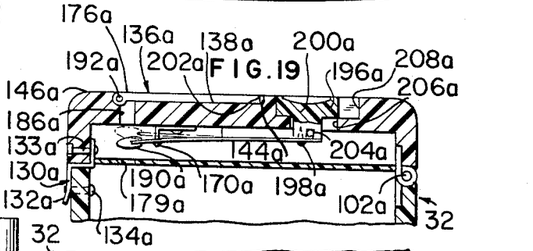
FIG. 19 is a cross-sectional view taken along line 19—19 of FIG. 18.

Referring now to FIGS. 17–19, there is shown and illustrated another access door constructed in accordance with the principles of the present invention and designated generally by the reference character 100(a) which is particularly adapted to be pivotably mounted or positioned upon the enclosure 32. The access door 100(a) may be mounted or positioned upon the enclosure 32 in substantially any desired manner, such as, and by way of example only, by means of the door mounting assembly 102, a generally conventional hinge 102(a) as shown, or the like. The access door 100(a) may be adapted to be maintained in the closed position thereof with respect to the housing 32(a) in any suitable manner, as through the medium of a closure assembly 130(a) having a resilient strap member 132(a) secured with the access door 100(a) as by means of a rivet or pin 133(a) and a pin or post 134(a) structurally associated with the housing 32(a).

The access door 100(a) may further comprise a recess, generally designated by the reference character 136(a). The recess 136(a) is defined by a bottom wall 138(a) and a ledge 144(a) extending from the bottom wall 138(a) to the exterior surface 146(a) of the access door 100(a).

The access door 100(a) may comprise, still further, a photosensitive material or film positioning or locating assembly, generally designated by the reference character 174(a). The assembly 174(a) may comprise a film removal and tear-off door 176(a) of generally rectangular configuration fabricated, for example, of sheet metal, plastic, or the like provided with a serrated edge 202(a) adapted to cooperate with the ledge 144(a) for severing successive portions of the photosensitive material or film 82 from one another. The film removal and tear-off door 176(a) may be of substantially the same dimensional extent as the recess 136(a), so that the exterior surface of the film removal and tear-off door 176(a) will lie substantially flush with the exterior surface 146(a) when the film removal and tear-off door 176(a) is closed, or in the position shown. The film removal or tear-off door 176(a) may be particularly adapted to be pivotably moved relative to the recess 136(a) in substantially any manner, and, by way of example only, may be secured relative thereto as by means of pivot pins, screws, rivets, or the like 192(a) engaged with flanges 182(a) provided on the door 176(a). A recess 140(a) may be provided extending generally inwardly of the exterior surface 146(a) of the access door 100(a) to enable a finger to be engaged under the film removal and tear-off door 176(a) for moving the door 176(a) outwardly of the recess 138(a). A latch 164(a) may also be, for example, pivotally associated with the access door 100(a) extending generally outwardly of the exterior surface 146(a) thereof and adjacent the recess 138(a) for movement between a latching position, shown in solid in FIG. 17 and an unlatched position, shown in phantom therein.

The access door 100(a) may be further provided with an elongate slot 186(a) extending generally inwardly from the bottom surface 138(a) of the recess 136(a) for enabling the passage therethrough of the photosensitive material or film 82 with the film locating or positioning assembly 174(a) being particularly adapted to locate or position the photosensitive material or film 82 as it passes through the slot 186(a).

The film locating or positioning assembly 174(a) may comprise a plurality of pins 190(a) particularly adapted to be movable between a film locating or positioning position illustrated in solid lines in FIG. 18 and a photosensitive material or film advancing enabling position illustrated in in phantom in FIG. 18. The pins 190(a) may be mounted upon a support bracket 180(a) which may, as shown, be of generally squared wide shaped configuration comprising bifurcations or legs 184(a) to which the pins 190(a) are structurally associated, a cross member 188(a), and an actuating arm 194(a). The legs or bifurcations 184(a) may extend in a first direction generally outwardly of the end portions of the arm 188(a) and the actuating portion 194(a) may extend generally outwardly thereof in a generally opposite direction. An actuating handle or button 196(a) may be structurally associated with the rearward end portion of the actuating member 194(a), as by means of a screw 198(a) and may comprise a head 200(a) and a stud 204(a), the stud 204(a) extending through an aperture 206(a) provided in the access door 100(a), as shown. The head portion 200(a) may be disposed at least partially within a recess 208(a), as shown. Accordingly, upon movement of the head portion 200(a) within the recess 208(a), it may be readily seen that the pins 190(a) will be moved between their advanced and retracted positions or between the photosensitive material or film locating or positioning positions and the film movement enabling positions thereof.

The film locating or positioning assembly 174(a) may be biased towards a photosensitive material or film locating or positioning position in substantially any manner, as for example, by means of a leaf spring 166(a) positioned, for example, relative to the access door 100(a) by means of support blocks 168(a) secured therewith. At least a portion of the bracket 180(a) may be resilient, at least in a direction generally perpendicular to the access door 100(a) or, the entire bracket 180(a) may be constructed and arranged in substantially any manner as to enable the pins 190(a) to be slightly movable generally outwardly of the access door 100(a) and biased to a position slightly spaced therefrom. For example, the bifurcations 184(a) may be structurally associated with a spring member 170(a) fabricated of wire, or the like, which is medially structurally associated with the access door 100(a) as by means of a bracket 172(a) and fasteners, such as screws 174(a). Accordingly, the pins 190(a) would be slightly spaced from the access door 100(a), in the free position thereof, as shown in solid lines in FIG. 19. Yet, upon engagement through the apertures 222 of the photosensitive material of film 82 the locating pins 190(a) will be moved slightly into abutment with the access door 100(a), as shown in phantom in FIG. 19. Upon movement of the button 200(a) generally away from the slot 186(a), however, the pins 190(a) will be released from engagement with the photosensitive material or film 82 and the spring 170(a) will be effective to move the pins 192(a) generally away from the access door 100(a) and away from the locating apertures 222 of the photosensitive material or film 82. Hence, it is merely necessary to move the button 200(a) away from the slot 186(a) to release the pins 190(a) from the aperture 222. Then, and at any succeeding time, the leading edge of the photosensitive material or film 82 may be grasped to pull the photosensitive material or film 82 to the next succeeding position thereof, whereupon the pins 190(a) will automatically engage within the locating apertures 222 to stop further outward movement of the photosensitive material or film 82. Accordingly, it is merely necessary to perform two distinct operations, namely, movement of the button 200(a) followed by movement of the photosensitive material or film 82, rather than being necessary to hold the button 200(a) during movement, or during start of movement of the photosensitive material or film 82. An inner cover 178(a) may be structurally associated with the interior of the access door 100(a) to enclose the film locating or positioning assembly 174(a), if desired. The cover 178(a) may be provided with a slot 179(a), as shown in FIG. 19 in general alignment with the slot 186(a).

It has hereinbefore been pointed out that the access door 100(a) comprises a film locating or positioning assembly. Assuming that the cartridge 34 has been inserted within the housing 32, and the access door 100(a) moved to a closed position, it is necessary to move the film locating assembly to a film locating position in order to bring the first portion of the film to a position upon the image plane 80. The latch 164(a) is then moved to the unlatched position thereof, as shown in phantom in FIG. 17 and the door 176(a) is then moved or pivoted to the open position thereof by grasping the edge thereof through the recess 140(a) to expose the film leader. The button 200(a) must also be moved generally away from the door 176(a) to release the pin 190(a) from the apertures 222 of the photosensitive material or film 82. The film leader can now be grasped, and the film 82 pulled or moved to a position in which a first pair or plurality of apertures 222 are in alignment with the tits 190(a). Due to the tension of the spring 166(a) and the spring 170(a), the pins 190(a) will pass through the apertures 222. The user continues to pull the film leader, during which movement the pins 190(a) will be moved against the biasing of the spring 170(a) toward the surface 146(a) of the access door 100(a) until they engage or bottom out thereupon. It will now be understood that the spring 170(a) tends to bias the pins 190(a) to the normal position thereof, that is, spaced apart from the access door 100(a), as shown in phantom in FIG. 19.

A first successive portion of the photosensitive material or film 82 is now positioned at the image plane 80 of the cartridge 34, and is particularly adapted to be exposed to a subject image in a manner that is considered readily apparent to those skilled in the art. The door 176(a) is now pivoted or moved to the closed position thereof and the latch 164(a) moved to the latching position thereof to lock or latch the door 176(a) against being inadvertently opened. After this first successive portion of the film has been exposed, it is necessary to move it into the liquid-tight chamber of the cartridge 34 that contains the requisite developing solution or solutions.

The button 200(a) is now again moved generally towards the left as shown in FIG. 17, or away from the door 176(a). As a result, the pins 190(a) will be withdrawn from the apertures 222(a) and the spring 170(a) will cause the pins 190(a) to move away from the access door 100(a) to a location in which they again are spaced apart therefrom. Upon releasing the button 200(a), the spring 166(a) will again move the pins 190(a) to a location in which they once again rest upon the film 82 just behind the first set of locating apertures 222. It can be readily seen that in the absence of this floating movement of the pins 190(a) the pins 190(a) would tend to re-enter the same set of locating apertures 222 from which they are disengaged each time the button 200(a) is released. This floating movement of the pins 190(a) occurs in two phases; in the first phase, after the pins 190(a) are engaged within a set or pair of locating apertures 222, the pins are moved or floated towards the door 176(a), as shown in phantom in FIG. 19; in the second phase, when the pins are disengaged from the locating aperture 222, the pins float or move away from the door 176(a) and thus return to a spaced apart relationship with the access door 100(a). It is emphasized that upon release or disengagement from the apertures 222, the pins 190(a) are biased by the springs 166(a) and 170(a) to move to a position in which they again bear upon the film 82 at a location just behind the set of locating aperture 222 from which they were previously disengaged.

A first portion of the film 82 has now been exposed, it is ready to be moved into the liquid-tight developing chamber of the cartridge 34, and the button 200(a) has been moved to the left to release the pins 190(a) from the apertures 222 and moved to locations in which they bear upon the film just behind the first set of locating apertures 222 which were responsible for such first position of the film at the image plane 80. The latch 164(a) is again moved to the unlatched position thereof, and the door 176(a) opened. The user again pulls on the film until the next set of locating apertures 222 is in alignment with the pins 190(a) whence the latter enters the second set of locating apertures 222. The user continues to pull the film, thus pulling the pins 190(a) against the access door 100(a), as shown in phantom in FIG. 19 and causing them to float away from the free position thereof. At this time, the exposed portion of the film will be located within the liquid-tight developing chamber of the cartridge 34. The door 176(a) may be closed or may remain open. The user now waits the required time for the exposed portion of the film to be developed. It is to be understood that during this time an exposable portion of the film 82 is not located upon the image plane 80 of the cartridge 34. The required time for the developing having expired, the button 200(a) is again moved away from the door 176(a) and the pins 190(a) again moved to a location just behind the set of locating apertures 222 from which they have previously been disengaged. The door 176(a) is again opened, if it has been previously closed. The film is pulled by the user, until the next set of locating apertures 222 is in alignment with the pins 190(a), whence the latter enters the apertures 222. The user continues to pull the film, thus pulling the pins 190(a) and causing them to float towards the door 176(a) until they once again bottom out upon the access door 100(a). The door 176(a) is then closed, and the developed portion of the film severed by means of the serrations or teeth 202(a) in a manner that is considered readily apparent to those skilled in the art. In removing the developed portion of the film and severing it, the next successive portion of the film capable of being exposed to a subject image is moved into position upon the image plane 80 and is properly located by means of the next set of locating apertures 222. The procedure is repeated until all of the available exposable portions of the film 82 have been exposed to a subject image and developed. At such time, the access door 100(a) is open, in a manner considered readily apparent to those skilled in the art, and the used cartridge 34 removed from the enclosure 32. The used cartridge can now be disposed, and a new cartridge positioned in its place.

Figure 20:
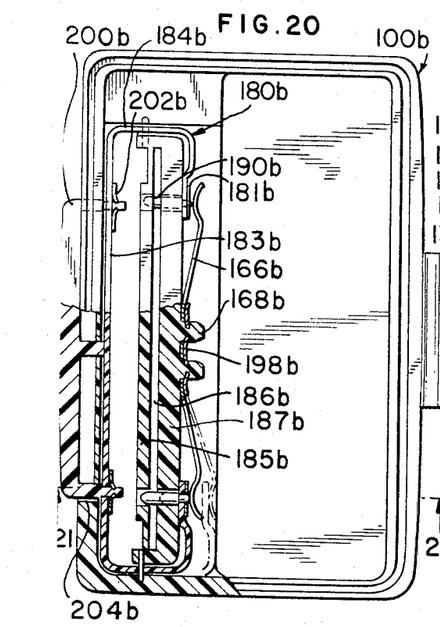
FIG. 20 is a view similar to FIG. 18 of yet another access door construction in accordance with the present invention.
Figure 21:
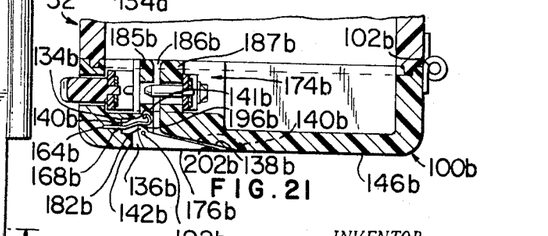
FIG. 21 is a cross-sectional view taken along line 21—21 of FIG. 20.

Referring now to FIGS. 20 and 21, there is shown and illustrated a still further access door constructed in accordance with the principles of the present invention and designated generally by the reference character 100(b) which is particularly adapted to be pivotably mounted or positioned upon the enclosure 32. The access door 100(b) may be mounted or positioned upon the enclosure 32 in substantially any desired manner, such as, and by way of example only, by means of the door mounting assembly 102, a generally conventional hinge 102(b), as shown, or the like. The access door 100(b) may be adapted to be maintained in the closed position thereof with respect to the housing 32 in any suitable manner.

The access door 100(b) may further comprise a recess generally designated by the reference character 136(b). The recess 136(b) may be defined by an angularly disposed wall 138(b), a bottom wall 140(b) and a ledge 142(b). The bottom wall 140(b) may be provided with recess means 141(b) and the ledge 142(b) may be provided with recess means 143(b) extending generally inwardly thereof as shown.

The access door 100(b) may comprise, still further, a photosensitive material or film positioning or locating assembly, generally designated by the reference character 174(b). The assembly 174(b) may comprise a film removal and tearoff door 176(b) of generally rectangular configuration fabricated, for example, of sheet metal, plastic, or the like provided with a serrated edge 202(a) adapted to cooperate with the wall 138(b) for severing successive portions of the photosensitive material or film 82 from one another. The film removal and tearoff door 176(b) may be of substantially the same dimensional extent as the recess 136(b) so that the exterior surface of the film removal and tearoff door 176(b) will lie substantially flush with the exterior surface 146(b) when the film removal and tearoff door 176(b) is closed, or in the position shown. The film removal or tearoff door 176(b) may be particularly adapted to be pivotably moved relative to the recess 136(b) in substantially any manner, and, by way of example only, may be secured thereto as by means of pivot pins, screws, rivets, or the like 192(b) engaged with flanges or ears 182(b) provided on the door 176(b). A recess 140(b) may be provided extending generally of the exterior surface 146(b) of the access door 100(b) to enable a finger to be engaged under the film removal and tearoff door 176(b) for moving the door 176(b) outwardly of the recess 136(b). A pair of resilient over-center assemblies generally designated by the reference character 164(b) may be mounted within the door 100(b) and cantilevered into the recess 136(b) in any suitable manner, such as by points 168(b) formed integrally therewith for engaging the material of the access door 100(b). It will now be understood that each assembly 164(b) is connected only at one end thereof with the door 100(b) and, at the other end thereof, is free to move between and assume a plurality of substantially vertically spaced positions. Each of the resilient over-center assemblies 164(b) may be fabricated of any suitable material, and, for example, may be fabricated of a spring steel.

It will now be understood that the ears 182(b) of the door 176(b) are particularly adapted to provide camming surfaces 196(b) that are each particularly adapted to be engaged by a corresponding one of the resilient over-center floating assemblies 164(b). As hereinbefore pointed out, the resilient floating assemblies 164(b) are each constructed and arranged to define an over-center spring. Thus, the inherent degree of resiliency of each of the assemblies or springs, and the normal position thereof relative to the access door 100(b) and to the door 176(b) is chosen to enable the springs 164(b) to exert a force against the camming surfaces 196(b) of a magnitude sufficient to move the doors 176(b) to either the open or closed position thereof once it has passed its center of movement. Accordingly, in moving the door 176(b) to the open position thereof, it is only necessary to move the door to an extent sufficient to enable the floating springs 164(b) to take over and move the door 176(b) the rest of the way. Once the door is in the open position, it will then be maintained therein by the floating assemblies or springs 164(b). The reverse is similarly true. Hence, the door 176(b) may be maintained in either the opened or closed position thereof by the assemblies or springs 164(b). The access door 100(b) may be further provided with an elongate slot 186(b) defined by walls 185(b) and 187(b) forming integral parts of the access door 100(b). The slot 186(b) extends generally inwardly of the bottom of the recess 136(b) for enabling the passage therethrough of the photosensitive material or film 82 with the film locating or positioning assembly 174(b) being particularly adapted to locate or position the photosensitive material or film 82 as it passes through the slot 186(b).

The film locating or positioning assembly 174(b) may comprise a plurality of pins 190(b) particularly adapted to be movable between a film or locating or positioning position illustrated in solid lines in FIG. 20 and a photosensitive material or film advancing enabling position illustrated in phantom therein. The pins 190(b) may be mounted with a support bracket 180(b), as by means of push nuts 181(b). The bracket 180(b) may be of generally C-shaped configuration extending substantially about the walls 185(b) and 187(b) with the end portions 184(b) thereof being of somewhat greater dimensional extent than the walls 185(b) and 187(b) so that the bracket 180(b) may move relative thereto between the solid position shown in FIG. 20 and the phantom position shown therein. The bracket 180(b) may further comprise a medial section 183(b) to which there may be structurally associated an actuating handle 200(b), as by means of push nuts 202(b). The actuating handle 200(b) may extend outwardly of the access door 100(b), as through an aperture 204(b) provided therein. The wall 187(b) may be provided with a plurality of studs 168(b) upon which a leaf spring 166(b) may be mounted, as by means of a double push nut 198(b). The leaf spring 166(b) may be constructed and arranged with the outboard end portions thereof particularly adapted to bias the pins 190(b) and the associated bracket 180(b) and handle 200(b) towards the film locating position thereof. The pins 190(b) may be additionally resiliently mounted for movement generally transversely of the slot, that is, towards and away from the door 176(b) so that it would be merely necessary to move the button 200(b) inwardly to release the pins 190(b) from the of the slot 204(b) to release the pins 190(b) from the apertures 222 of the photosensitive material or film 82 in a manner similar to that previously described.

The access door 100(b) would then be operated for enabling the location and positioning of the photosensitive material or film 82 for exposure and subsequent development and removal thereof from the camera 32.

Figure 22:
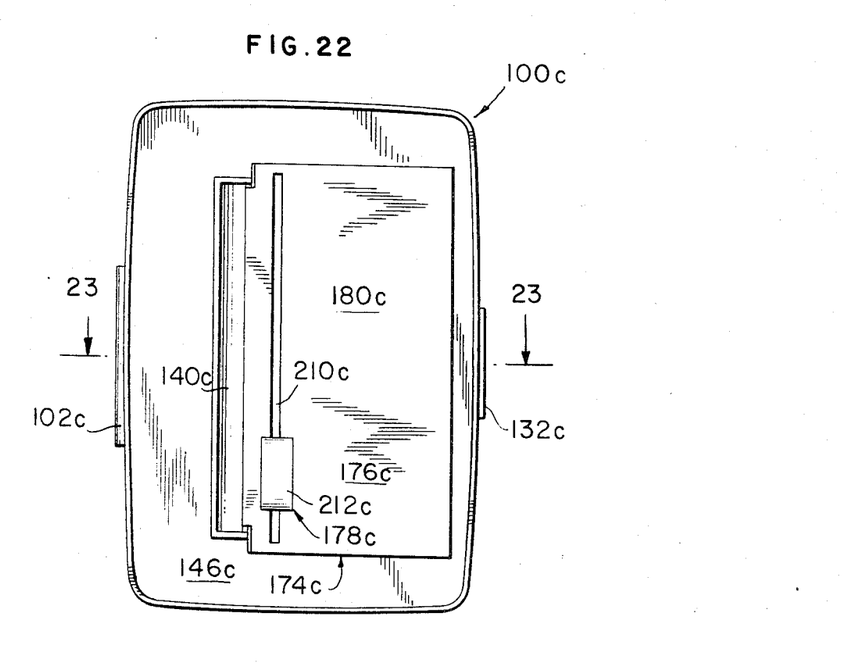
FIG. 22 is an elevational view of the outside of still another access door constructed in accordance with the present invention.
Figure 23:
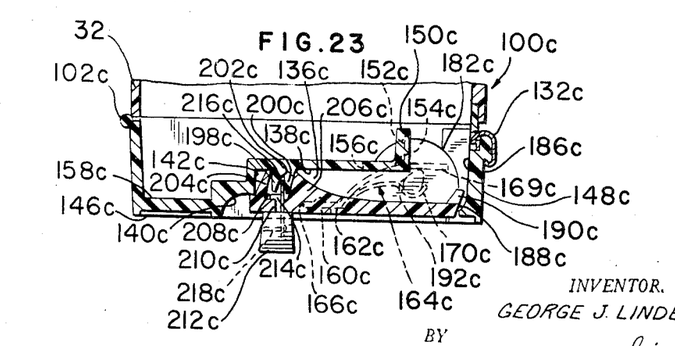
FIG. 23 is a cross-sectional view taken along line 23—23 of FIG. 22.

With reference now to the drawing, and particularly to FIGS. 22 and 23, there is shown and illustrated another access door constructed in accordance with the principles of the present invention and designated generally by the reference character 100(c). The access door 100(c) may comprise a recess, generally designated by the reference character 136(c). The recess 136(c) may be defined by a bottom wall 138(c), a generally quadri-cyclindrical wall 140(c) and a ledge 142(c) extending therebetween. The bottom wall 138(c) may extend towards one end 148(c) of the access door 100(c), the end upon which a closure element 132(c) may be mounted, and may be separated therefrom by a wall 150(c) which may comprise a plurality of vertically extending spaced apart grooves 152(c). One end of each of the grooves 152(c) may define a stop surface 154(c), the purpose of which will be described more fully hereinafter.

The access door 100(c), at each end of the wall 150(c), is provided with a groove 156(c) which extends into the bottom wall 138(c). The interior surface 158(c) of the door is provided with a mounting boss 160(c) on either side of the bottom wall 138(c) which merges into a tapered veering surface 162(c). A pair of resilient over-center floating assemblies generally designated by the reference character 164(c), to be described more fully hereinafter, are mounted within the door, one end 166(c) of each such assembly being fixedly positioned upon a corresponding one of the mounting bosses 160(c) in any suitable manner. It will now be understood that each assembly 164(c) is connected only at one end thereof to the door 100(c) and, at the other end thereof, is free to move between and assume a plurality of substantially vertically spaced positions.

Each resilient over-center floating assembly 164(c) may further comprise a body portion 169(c) and a positioning loop 170(c) of substantially semi-circular configuration. Each of the resilient over-center floating assemblies 164(c) may be fabricated of any suitable material, and, for example, may be fabricated of a spring steel. The access door 100(c) may comprise, still further, a photosensitive material or film positioning or locating assembly, generally designated by the reference character 174(c). The assembly 174(c) may comprise a film positioning or locating door 176(c) and a slitter assembly 178(c) for severing successive portions of the photosensitive material or film 82 from one another. The film locating or positioning door 176(c) may comprise a planar body 180(c) of generally rectangular configuration and a plurality of arms 182(c). The arms 182(c) are particularly adapted to be disposed within a corresponding one of the grooves 156(c). The height of each of the arms 182(c) may be substantially the same as the difference from the exterior surface 146(c) of the door 100(c) to the bottom wall 138(c), so that the exterior surface of the film locating or positioning door 176(c) will lie substantially flush therewith when the latter is in the position shown. Similarly, the transverse dimensions of the door 176(c) may be substantially the same as the distance between the wall 142(c) and the inside surface 186(c) of the wall defining the end 148(c) of the door 100(c). The door 176(c) may comprise, further, a plurality of tits 190(c) mounted on the door along the edge 188(c) thereof and, therefore, with the edge are also particularly adapted to be pivoted towards the wall 150(c). The space between the tits 190(c) is the same as the space between the grooves 152(c), enabling the tits 190(c) to enter a corresponding one of the grooves 152(c) when the door is pivoted to the fully opened position thereof whereat the tits 190(c) will be engaged through the apertures 222 of the photographic material or film 82 so that no movement of the photosensitive material or film 82 may take place when the door is in such fully opened position.

The door 176(c) may further comprise a camming lug 192(c) that extends laterally outwardly from each of the arms 182(c). The camming lug 192(c) may be of generally key-hole shaped configuration, as illustrated. It will now be understood that the camming lugs 192(c) are each particularly adapted to be positioned within a corresponding one of the resilient overcenter floating assemblies 164(c). As hereinbefore pointed out, the resilient floating assemblies 164(c) may be constructed and arranged to define an over-center spring. Thus, the inherent degree of resiliency of each of the assemblies or springs, and the normal position of the camming portion 172(c) relative to the body portion 168(c) is chosen to enable the camming portion to exert a force against the camming lugs 192(c) to tend to move the door 176(c) to either of the positions thereof once it has passed its center of movement. Accordingly, in moving the door 176(c) to the film locating position, it is only necessary to move the door to an extent sufficient to in turn move the camming lugs just past their center position. The floating springs 164(c) will then take over and move the door 176(c) the rest of the way. Once the door is in a film locating position, it will then be maintained therein by the floating assemblies or springs 164(c). The reverse is similarly true. The quadri-cylindrical recess 140(c) enables the fingers to be engaged beneath the door 176(c) for moving into its fully opened or film locating position.

As hereinbefore pointed out, the film locating or positioning assembly 174(c) comprises a slitting assembly 178(c) for severing successive portions of the photosensitive material or film 82. The slitter assembly 178(c) may comprise a plurality of elongate ridges 198(c) and 200(c) extending generally adjacent to and parallel the wall 146(c) and extending upwardly of the bottom wall 188(c) into the recess 136(c). The ridges 198(c) and 200(c) accordingly define therebetween a valley or groove 202(c). The inner surface of the door 180(c) is similarly provided with a plurality of elongate ridges 204(c) and 206(c) adapted to generally straddle the ridges 198(c) and 200(c) in the closed position of the door 180(c). The ridges 204(c) and 206(c) define therebetween a groove 208(c) within which the ridges 198(c) and 200(c) are particularly adapted to be disposed. The door 180(c) may be further provided with a generally elongate slot 210(c) extending into the groove 208(c). A slitter handle 212(c) having a stud 214(c) is adapted to be disposed in slotting engagement with the slot 210(c) and to be slidable therealong. A blade 216(c) may be structurally associated with the handle 212(c), as by means of a rivet 218(c), as shown with the blade 216(c) extending into the valley or groove 202(c) between the ridges 198(c) and 200(c). Accordingly, with the door 180(c) in the closed position thereof, the handle 212(c) and associated blade 216(c) may be moved laterally along the slot 210(c) to sever the photosensitive material or film 82 generally transversely thereof.

It has hereinbefore been pointed out that the door 176(c) and the slitting assembly 178(c) comprise a film locating or positioning assembly. Assuming that the cartridge 34 has been inserted within the housing 32, and the access door 100(c) moved to a closed position, it is necessary to move the film locating assembly to a film locating position in order to bring the first portion of the film to a position upon the image plane 80. The door is thus pivoted or moved to an open position thereof by inserting the fingers into the quadri-cylindrical groove 140(c). As the door is pivoted to an open position, the cam 192(c) will pass its center position, enabling the over-center spring assembly 164(c) to maintain the door in this position. In so moving the door, the tits 190(c) will have been pivoted to a position in which they rest upon a film leader that is presented when the door 176(c) is, in effect, first opened. The film leader can now be grasped, and the film 82 pulled or moved to a position in which a first pair or plurality of apertures 222 are in alignment with the tits 190(c). Due to the tension of the over-center assemblies 164(c), a further movement of the door 176(c) to a film locating position will take place, thus causing the tits 190(c) to pass through the apertures 222 and into the grooves 152(c) in the wall 150(c). The user continues to pull the film leader, during which movement the door 176(c) will move in a vertical direction and the tits 190(c) will ride within the grooves 152(c) until they engage or bottom out upon the surface 154(c). This movement of the door can take place since the over-center assemblies 164(c) are inherently resilient, and are fixedly mounted within the access door 100(c) only at the mounting bosses or surfaces 160(c). The resilient over-center assemblies 164(c) are thus floating assemblies, as hereinbefore pointed out, and are movable between a normal position and a flexed position. It is in this latter position that the door 176(c) has been pulled along the film 82 until the tits 190(c) have bottomed out upon the surface 154(c) of the grooves 152(c). It will now be understood that the resilient floating assemblies 164(c) tend to bias the door 176(c) to its normal position, and must therefore be flexed in order to allow the door 176(c) to be moved to the closed position thereof.

A first successive portion of the photosensitive material or film 82 is now positioned at the image plane 80 of the cartridge 84, and is particularly adapted to be exposed to a subject image in a manner that is considered readily apparent to those skilled in the art. After this first successive portion of the film has been exposed, it is necessary to move it into the liquid-tight chamber of the cartridge 34 that contains the requisite developing solution or solutions.

The door 176(c) is once again moved to the fully opened position. At this point, it is to be noted that when the door 176(c) was closed, the floating assemblies 164(c) moved the door towards the bottom wall 138(c) due to the biasing force exerted thereagainst. As a result, when the door 176(c) is once again moved to a film locating position, the tits 190(c) will have been pivoted to a location in which they once again rest upon the film 82 just behind the first set of locating apertures 222. It can readily be seen that in the absence of this floating movement of the door 176(c), the tits 190(c) would tend to re-enter the same set of locating apertures 222 from which they are disengaged each time the door is moved to its closed position. This floating movement of the door occurs in two phases; in the first phase, after the tits 190(c) are engaged within a set or pair of locating apertures 222, the door is moved or floated away from the bottom wall 138(c); in the second phase, when the door is pivoted to a closed position and the tits 190(c) are disengaged from the locating apertures 222, the door floats or moves toward the bottom wall 138(c), and thus returns to its normal position. It is emphasized that when the door is again moved or pivoted to a film locating position, the tits 190(c) are pivoted to a position in which they bear upon the film 82 at a location just behind the set of locating apertures 222. It is also to be noted that each set of locating apertures 222 will be positioned at the surface 154(c) of the grooves 152(c) when the door 176(c) is to be moved to a closed position, and the tits 190(c) disengaged therefrom. The door is maintained in each of its positions by the camming portion of the floating assemblies 164(c), and is actually urged to each of these positions by the camming portion once the cams 192(c) have passed their center position, as hereinbefore pointed out.

A first portion of the film 82 has now been exposed, it is ready to be moved into the liquid-tight developing chamber of the cartridge 34, and the door 176(c) has been pivoted or moved to a film locating position, in which position the tits 190(c) have been pivoted to a location in which it bears upon the film just behind the first set of locating apertures 222 which was responsible for such first portion of the film at the image plane 80. The user again pulls on the film until the next set of locating apertures 222 is in alignment with the tits 190(c), whence the latter enters the apertures and the grooves 152(c). The user continues to pull the film, thus pulling the door therewith, and causing it to float away from the bottom wall 138(c). During this floating movement of the door, the tits 190(c) ride within the grooves 152(c) until they once again bottom out upon the surface 154(c) thereof. At this time, the exposed portion of the film will be located within the liquid-tight developing chamber of the cartridge 34. It is necessary now to close the door 176(c). As the door is pivoted to the closed position thereof, it will float towards the bottom wall 138(c) and then return to the normal position with respect thereto under the biasing action of the floating assemblies 164(c). The user now waits the required time for the exposed portion of the film to be developed. It is to be understood that during this time an exposable portion of the film 82 is not located upon the image plane 80 of the cartridge 34. The required time for the developing having expired, the door 176 is again moved to a film locating position, and the tits 190(c) pivoted to a location just behind the set of locating apertures 222 from which they have previously been disengaged. The film is pulled by the user, and the developed portion of the film severed by means of the slitting assembly 178(c).

While the invention has been described, disclosed, illustrated and shown in terms of certain preferred embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and breadth of the claims here appended.

What is claimed is:

1. An access door particularly adapted to be mounted upon the housing of photographic apparatus for exposing successive photosensitive portions of a web provided with successive sets of locating apertures of a plurality of different types to a subject image and developing each such portion prior to locating the next such portion in a position for exposure to the same or another such image completely therewithin, said access door comprising, in combination, a recess being defined at least in part by a plurality of bottom walls; one of said bottom walls having a lip extending along an end thereof, and being spaced from the access door to define a space therebetween particularly adapted to be disposed in alignment with an area in said photographic apparatus from which the web exits therefrom when the access door is in a closed position with respect thereto.

2. An access door as defined in claim 1, wherein the lip of said one bottom wall comprises a plurality of grooves extending towards said bottom wall and having a stop surface.

3. An access door as defined in claim 2, wherein one of the different types of locating apertures is adapted to position a photosensitive web portion for exposure to a subject image, and another type of said apertures is adapted to position the exposed portion for development before the next portion capable of being exposed is located in its position for that purpose; a floating photosensitive material or film locating assembly positioned to cooperate with said access door comprising a floating door having a plurality of tits engageable with successive sets of alternately different types of said locating apertures; a plurality of arms each having an ear; a camming lug extending outwardly of each of said ears.

4. An access door as defined in claim 3, wherein said access door further comprises a channel in said one bottom wall at each end of the lip; the ears of said floating door being positionable within the channels in said one bottom wall; wherein there is provided a plurality of resilient over-center floating assemblies mounted within said access door, and comprise a positioning loop; and a camming portion; and wherein said camming lugs comprise a portion particularly adapted to be disposed in the positioning loop of a corresponding one of said resilient over-center floating assemblies, and another portion adapted to engage and move along the camming portion thereof; said resilient floating assemblies exerting a biasing force against the floating door tending to normally dispose it in a position in which the arms thereof substantially rest upon said one bottom wall; said floating door being pivotably movable between a closed position with respect to said access door, and an opened or film locating position with respect thereto; said tits, as the floating door is pivoted to its open position, being pivotally moved towards the lip of said one bottom wall, enabling them to enter the grooves thereof subsequent to engagement with said locating apertures, and as the pivoting movement of the door continues, further enabling the tits to move along said grooves and bottom-out on the stop surface thereof; the engagement of said tits with the locating apertures as the photosensitive material is grasped and pulled from the space in said access door, and along said one bottom wall, enabling a force to be exerted on the floating door of sufficient magnitude to overcome the biasing force of said resilient assemblies, further enabling the door to float away from said one bottom wall until the tits bottom out on the stop surfaces; said resilient floating assemblies maintaining the floating door in each of its positions with respect to the access door, and urging the floating door towards each of said positions once the other portion of the camming lugs pass their center of movement along the camming portion of said assemblies.

5. An access door as defined in claim 4 wherein said access door further comprises an internal surface and an external surface, said internal surface having a plurality of mounting bosses, and a corresponding number of bearing portions, each of said mounting bosses and bearing portions being disposed substantially adjacent a side wall of said access door; a plurality of end walls, the side walls and the end walls of said access door defining said recess therein which extends from said external surface toward the internal surface thereof; and wherein said resilient over-center floating assemblies further comprise a mounting portion fixedly positioned upon the mounting bosses, and a curvilinear body portion extending from the mounting portion towards the space in said access door.

6. An access door as defined in claim 5, wherein said access door further comprises a first ledge extending between said plurality of bottom walls, and a second ledge extending between another of said bottom walls and the external surface of said access door; and a plurality of beads extending outwardly of said other bottom wall towards the external surface of said access door substantially at said first ledge and in a direction towards one another; and wherein said floating material locating assembly further comprises a tearing assembly positioned in cooperative relationship with said floating door, and comprising a top wall having a plurality of side walls each being defined by a tab insertable within a corresponding one of a plurality of slots provided in said floating door, and adapted to be turned towards one another subsequent to insertion therewith, and a tear strip having a serrated edge; and a reverse projection engageable with the beads on said access door when the floating door has been pivotally moved to a closed position with respect thereto, in which position the tear strip will be disposed substantially adjacent said other bottom wall and between the first and second ledges; the cooperative relationship between the tearing assembly and said floating doors presenting play therebetween, enabling said reverse projections to engage the beads and lock the door in its closed position until the tearing assembly is grasped in a manner to, in effect, pivot it in a direction to effect disengagement therefrom.

7. An access door as defined in claim 6, wherein said floating door comprises a body having an edge along which said tits are disposed at an obtuse angle with respect thereto.

8. An access door as defined in claim 7, wherein there is further provided a mounting assembly for removably pivotably mounting said access door upon said photographic apparatus, said mounting assembly comprising a boss positioned upon said door having a plurality of recesses, a resilient element comprising a plurality of legs each having a finger at one end thereof insertable within the recesses of said boss, and a raised portion extending from the plane in which said element lies; and a bight extending from the plane in which said element lies in the same direction as said raised portions; a wall particularly adapted to be positioned upon said housing and having a channel within which said resilient element is disposable, said channel comprising a plurality of walls engageable with the legs of said element to flex them towards one another; and an end wall; a panel extending across said channel engageable with the raised portions of the legs, and being spaced from the end wall of the channel to define a space within which the bight of said element is disposable.

9. An access door as defined in claim 8, wherein said resilient element is of generally trapezoidal configuration in an unflexed condition.

10. An access door as defined in claim 1 further comprising a door pivotably movable between a closed position substantially entirely within said recess and an open position extending outwardly thereof and means associated with said pivotably movable door for enabling the photosensitive material to be severed.

11. An access door as defined in claim 10 wherein said severing means comprises a slitter bar slidably associated with the pivotably movable door adjacent an edge thereof.

12. An access door defined in claim 11 wherein said severing means further comprises at least one ridge extending generally upwardly of said recess adjacent the path of travel of the slitter bar for cooperation therewith.

13. An access door defined in claim 11 wherein said severing means comprises a plurality of ridges structurally associated with the pivotably movable door adjacent to and on opposite sides of the path of travel of said slitter bar and a plurality of ridges extending upwardly of said recess adapted to be disposed between the door ridges and the slitter bar when the pivotably mounted door is in the closed position thereof.

14. An access door particularly adapted to be mounted upon the housing or photographic apparatus for exposing successive photosensitive portions of a web provided with successive sets of locating apertures to a subject image and developing each such portion prior to locating the next such portion in a position for exposure to the same or another such image completely therewithin, said access door comprising, in combination, a slot extending through said access door adapted for the passage therethrough of the web material and means movably associated with the access door adapted to be selectively disposed generally across said slot for engagement with the web material through the apertures and withdrawn therefrom for enabling the web material to move through said slot.

15. Access door defined in claim 14 further comprising means for biasing said engaging means toward the engaging position thereof.

16. Access door defined in claim 15 further comprising floating mount means for said engaging means to enable said biasing means, upon withdrawal of said engaging means from said apertures, to position said engaging means just rearwardly of said apertures.

17. Access door defined in claim 16 further comprising a recess and a door pivotably mounted with said access door for movement between a closed position substantially entirely within said recess and an open position extending generally outwardly thereof.

18. Access door defined in claim 17 wherein said engaging means are structurally associated with said recess door and wherein there is further provided means for floating said recess door relative to said access door.

19. Access door defined in claim 17 wherein said recess door comprises means for severing the web.

20. Access door defined in claim 16 further comprising actuating means for enabling manual movement of the engaging means outwardly of said slot.

References Cited

UNITED STATES PATENTS 3,053,160   9/1962   Bachelder et al. ______ 95—13 X
3,113,497   12/1963  Eloranta ____________ 95—13

NORTON ANSHER, *Primary Examiner.*

CHARLES B. FUNK, *Assistant Examiner.*